United States Patent
Case et al.

(10) Patent No.: US 6,956,999 B2
(45) Date of Patent: Oct. 18, 2005

(54) OPTICAL DEVICE

(75) Inventors: Steven K. Case, St. Louis Park, MN (US); Timothy A. Skunes, Mahtomedi, MN (US); Gregory S. Mowry, Burnsville, MN (US)

(73) Assignee: CyberOptics Corporation, Golden Valley, MN (US)

( * ) Notice: Subject to any disclaimer, the term of this patent is extended or adjusted under 35 U.S.C. 154(b) by 191 days.

(21) Appl. No.: 09/920,366

(22) Filed: Aug. 1, 2001

(65) Prior Publication Data

US 2002/0114580 A1 Aug. 22, 2002

Related U.S. Application Data

(63) Continuation-in-part of application No. 09/789,124, filed on Feb. 20, 2001, now Pat. No. 6,546,172, and a continuation-in-part of application No. 09/789,125, filed on Feb. 20, 2001, now Pat. No. 6,546,173, and a continuation-in-part of application No. 09/789,185, filed on Feb. 20, 2001, now Pat. No. 6,443,361, and a continuation-in-part of application No. 09/789,317, filed on Feb. 20, 2001, now Pat. No. 6,590,658.

(51) Int. Cl.⁷ .............................. G02B 6/26; G02B 6/42
(52) U.S. Cl. ......................................... 385/52; 356/153
(58) Field of Search ............................. 385/52; 356/153

(56) References Cited

U.S. PATENT DOCUMENTS

| | | | |
|---|---|---|---|
| 3,800,388 A | 4/1974 | Borner et al. ................. | 29/200 |
| 4,250,520 A | 2/1981 | Denlinger .................... | 357/68 |
| 4,457,467 A | 7/1984 | Klement et al. ............ | 228/103 |
| 4,708,429 A | 11/1987 | Clark et al. ................. | 350/96.2 |
| 4,720,163 A | 1/1988 | Goodwin et al. .......... | 350/96.2 |
| 4,730,198 A | 3/1988 | Brown et al. .............. | 350/96.2 |
| 4,737,845 A | 4/1988 | Susuki et al. ............... | 358/101 |
| 4,745,681 A | 5/1988 | Hollis, Jr. et al. ............ | 29/837 |
| 4,750,799 A | 6/1988 | Kawachi et al. .......... | 350/96.11 |

(Continued)

FOREIGN PATENT DOCUMENTS

| | | |
|---|---|---|
| DE | 23 58 785 | 6/1975 |
| DE | 196 44 758 A1 | 4/1998 |
| EP | 0 325 431 | 7/1989 |
| EP | 0544024 A1 | 6/1993 |
| EP | 0 840 154 A1 | 5/1998 |
| EP | 0907092 A1 | 4/1999 |
| EP | 0 977 061 A2 | 2/2000 |
| FR | 2 779 536 | 12/1999 |
| JP | 54-12286 | 1/1979 |
| JP | 62-276890 | 12/1987 |
| JP | 63-12187 | 1/1988 |
| JP | 63-65411 | 3/1988 |
| JP | 63-193113 | 8/1988 |
| JP | 63-228113 | 9/1988 |
| JP | 1-302214 | 12/1989 |
| JP | 6-34852 | 2/1994 |
| JP | 6-174943 | 6/1994 |
| JP | 6-201921 | 7/1994 |
| JP | 6-331840 | 12/1994 |
| JP | 7-333472 | 12/1995 |
| JP | 61-277908 | 12/1996 |

OTHER PUBLICATIONS

"Micro–Mechanical Alignment Structures (patent pending)", from Web Site of Axsun Technologies, 2 pages, downloaded Feb. 15, 2001.

(Continued)

*Primary Examiner*—Robert H. Kim
*Assistant Examiner*—Richard Kim
(74) *Attorney, Agent, or Firm*—Westman, Champlin & Kelly, P.A.

(57) ABSTRACT

An optical device includes a fixed reference. A first optical module has a first optical component prealigned with respect to a reference feature, the first optical module is subsequently mounted to a first predetermined location on the fixed reference. A second optical module has second optical component prealigned with respect to a reference feature, the second optical module mounted to a second predetermined location on the fixed reference.

22 Claims, 1 Drawing Sheet

U.S. PATENT DOCUMENTS

| | | | | |
|---|---|---|---|---|
| 4,752,816 A | | 6/1988 | Sussman et al. ............... 357/30 |
| 4,790,618 A | | 12/1988 | Abe ........................ 350/96.15 |
| 4,798,439 A | | 1/1989 | Preston ..................... 350/96.2 |
| 4,817,849 A | | 4/1989 | Yamamoto et al. ......... 228/103 |
| 4,845,052 A | | 7/1989 | Abend ........................ 437/209 |
| 4,854,667 A | * | 8/1989 | Ebata et al. ................. 385/134 |
| 4,892,377 A | | 1/1990 | Randle ...................... 350/96.2 |
| 4,909,590 A | | 3/1990 | Kamiko et al. .......... 350/96.22 |
| 4,954,458 A | | 9/1990 | Reid ........................... 437/51 |
| 4,979,970 A | | 12/1990 | Dannoux et al. ................. 65/2 |
| 4,989,934 A | | 2/1991 | Zavracky et al. ........ 350/96.11 |
| 5,023,881 A | * | 6/1991 | Ackerman et al. ............ 372/46 |
| 5,093,879 A | | 3/1992 | Bregman et al. ............. 385/93 |
| 5,113,404 A | | 5/1992 | Gaebe et al. ................. 372/36 |
| 5,123,074 A | | 6/1992 | Yokota et al. ................ 385/95 |
| 5,170,455 A | | 12/1992 | Goossen et al. ............. 385/89 |
| 5,177,807 A | | 1/1993 | Avelange et al. ............. 385/91 |
| 5,195,707 A | | 3/1993 | Ignatuk et al. ............. 248/179 |
| 5,210,811 A | | 5/1993 | Avelange et al. ............. 385/91 |
| 5,215,489 A | | 6/1993 | Nakamura ..................... 445/4 |
| 5,216,729 A | | 6/1993 | Berger et al. ................. 385/31 |
| 5,235,407 A | | 8/1993 | Spigarelli et al. ........... 356/399 |
| 5,247,597 A | | 9/1993 | Blacha et al. ................. 385/88 |
| 5,249,733 A | | 10/1993 | Brady et al. ........... 228/180.2 |
| 5,251,266 A | | 10/1993 | Spigarelli et al. ............. 382/8 |
| 5,283,446 A | | 2/1994 | Tanisawa .................... 257/433 |
| 5,296,072 A | | 3/1994 | Dannoux et al. ........... 156/257 |
| 5,322,463 A | | 6/1994 | Young ........................... 445/4 |
| 5,371,822 A | | 12/1994 | Horwitz et al. ............... 385/89 |
| 5,383,118 A | * | 1/1995 | Nguyen ...................... 356/388 |
| 5,450,508 A | | 9/1995 | Decusatis et al. ............. 385/25 |
| 5,471,310 A | | 11/1995 | Spigarelli et al. ........... 356/399 |
| 5,478,778 A | | 12/1995 | Tanisawa .................... 437/183 |
| 5,499,312 A | | 3/1996 | Hahn et al. ................... 385/91 |
| 5,535,296 A | | 7/1996 | Uchida ........................ 385/89 |
| 5,550,088 A | | 8/1996 | Dautartas et al. ........... 437/225 |
| 5,555,333 A | | 9/1996 | Kato ............................. 385/89 |
| 5,559,914 A | | 9/1996 | Asakura ...................... 385/49 |
| 5,568,892 A | | 10/1996 | Basavanhally ......... 228/180.22 |
| 5,570,184 A | | 10/1996 | Armington et al. ......... 356/375 |
| 5,574,561 A | | 11/1996 | Boudreau et al. ........... 356/399 |
| 5,603,870 A | | 2/1997 | Roll et al. .................. 264/1.25 |
| 5,625,733 A | | 4/1997 | Frigo et al. ................... 385/88 |
| 5,644,668 A | * | 7/1997 | Chambers et al. ............ 385/90 |
| 5,647,044 A | | 7/1997 | Basavanhally et al. ....... 385/92 |
| 5,659,641 A | | 8/1997 | DeMeritt et al. ............. 385/14 |
| 5,671,315 A | * | 9/1997 | Tabuchi et al. ............. 385/137 |
| 5,677,973 A | * | 10/1997 | Yuhara et al. ................ 385/90 |
| 5,687,267 A | | 11/1997 | Uchida ........................ 385/89 |
| 5,694,678 A | | 12/1997 | Karasik ....................... 29/721 |
| 5,700,987 A | * | 12/1997 | Basavanhally ............ 219/56.1 |
| 5,721,797 A | | 2/1998 | Basavanhally et al. ....... 385/49 |
| 5,737,467 A | | 4/1998 | Kato et al. .................... 385/92 |
| 5,745,624 A | | 4/1998 | Chan et al. ................... 385/91 |
| 5,748,822 A | | 5/1998 | Miura et al. .................. 385/90 |
| 5,748,827 A | | 5/1998 | Holl et al. .................. 385/134 |
| 5,778,120 A | | 7/1998 | Asakura et al. ............... 385/49 |
| 5,833,202 A | | 11/1998 | Wolfgang .................. 248/466 |
| 5,854,867 A | | 12/1998 | Lee et al. ..................... 385/49 |
| 5,859,943 A | | 1/1999 | Asakura et al. ............... 385/49 |
| 5,883,988 A | | 3/1999 | Yamamoto et al. ........... 385/14 |
| 5,892,179 A | | 4/1999 | Rinne et al. ................. 174/261 |
| 5,894,657 A | | 4/1999 | Kanayama et al. ........... 29/740 |
| 5,898,806 A | | 4/1999 | Nishimoto ................... 385/49 |
| 5,906,753 A | * | 5/1999 | Aoyagi et al. ................ 216/24 |
| 5,907,649 A | | 5/1999 | Acklin et al. ................. 385/49 |
| 5,916,458 A | | 6/1999 | Komoriya et al. ..... 219/121.63 |
| 5,966,486 A | | 10/1999 | Boudreau et al. ............. 385/90 |
| 5,970,200 A | | 10/1999 | Takikawa et al. ........... 385/137 |
| 5,985,086 A | | 11/1999 | Peall ......................... 156/292 |
| 6,010,251 A | | 1/2000 | Koyanagi et al. ............. 385/93 |
| 6,027,253 A | | 2/2000 | Ota et al. ..................... 385/83 |
| 6,027,254 A | | 2/2000 | Yamada et al. ............... 385/88 |
| 6,058,234 A | | 5/2000 | Tachigori ..................... 385/49 |
| 6,074,103 A | * | 6/2000 | Hargreaves et al. .......... 385/90 |
| 6,106,161 A | * | 8/2000 | Basavanhally et al. ....... 385/88 |
| 6,112,001 A | | 8/2000 | Kishida et al. ............... 385/49 |
| 6,115,515 A | | 9/2000 | Itoh et al. ..................... 385/14 |
| 6,118,917 A | | 9/2000 | Lee et al. ..................... 385/49 |
| 6,130,448 A | | 10/2000 | Bauer et al. ................. 257/222 |
| 6,132,106 A | | 10/2000 | Yokoyama ................... 385/74 |
| 6,148,511 A | | 11/2000 | Taguchi ....................... 29/834 |
| 6,151,173 A | | 11/2000 | Massit et al. ................ 359/811 |
| 6,155,515 A | | 12/2000 | Dorfel et al. ................. 285/14 |
| 6,157,050 A | | 12/2000 | Fukuoka ...................... 257/82 |
| 6,160,936 A | | 12/2000 | You et al. ..................... 385/49 |
| 6,164,837 A | | 12/2000 | Haake et al. ................. 385/90 |
| 6,222,579 B1 | * | 4/2001 | Sousa ........................ 347/241 |
| 6,327,407 B1 | * | 12/2001 | Mitsuda et al. ............... 385/49 |
| 6,467,972 B2 | * | 10/2002 | Setoguchi ..................... 385/88 |
| 6,470,120 B2 | * | 10/2002 | Green et al. .................. 385/52 |
| 6,606,785 B1 | | 8/2003 | Kadohata et al. ............. 29/740 |
| 6,654,524 B2 | | 11/2003 | Shekel et al. ................. 385/52 |
| 2001/0010743 A1 | * | 8/2001 | Cayrefourcq et al. ......... 385/88 |
| 2002/0037142 A1 | | 3/2002 | Rossi .......................... 385/92 |

OTHER PUBLICATIONS

"An Innovative Flexible and Accurate Packaging Technique Suited to Fabricate Low Cost Micro Optoelectronic Modules", by M. Scussat et al., *Electronic Components and Technology Conference*, 2000, pp. 26–32.

Article from Web Site entitled "The Photonics Program and the Engineering Research Division at LLNL are Automating the Packaging of Optoelectronic Devices to Lower Costs", 3 pages, downloaded Oct. 19, 2000.

Article from Web Site entitled "Automated Optoelectronic Packaging", 2 pages, downloaded Feb. 5, 2001.

Article from Web Site entitled Micro Assembly Automation, 3 pages., downloaded Feb. 5, 2001.

"Novel Fiber Alignment Method Using a Partially Metal–Coated Fiber in a Silicon V–Groove", by S. Kaneko et al., *IEEE Photonics Technology Letters*, vol. 12, No. 6, Jun. 2000, pp. 645–647.

"Notification of Transmittal of the International Search Report or the Declaration" PCT/US03/26006.

"Written Opinion" from PCT/US03/26006.

* cited by examiner

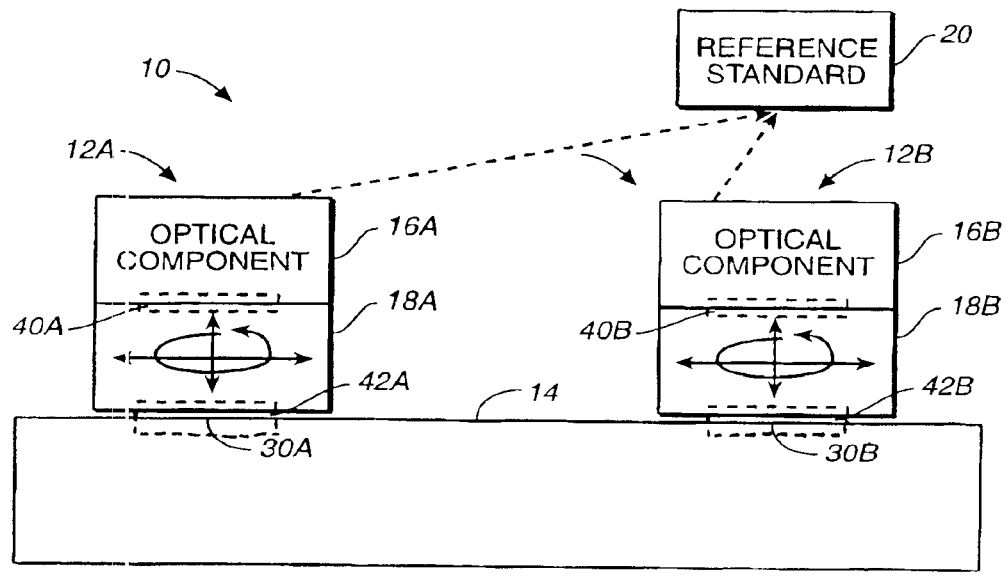
FIG._1
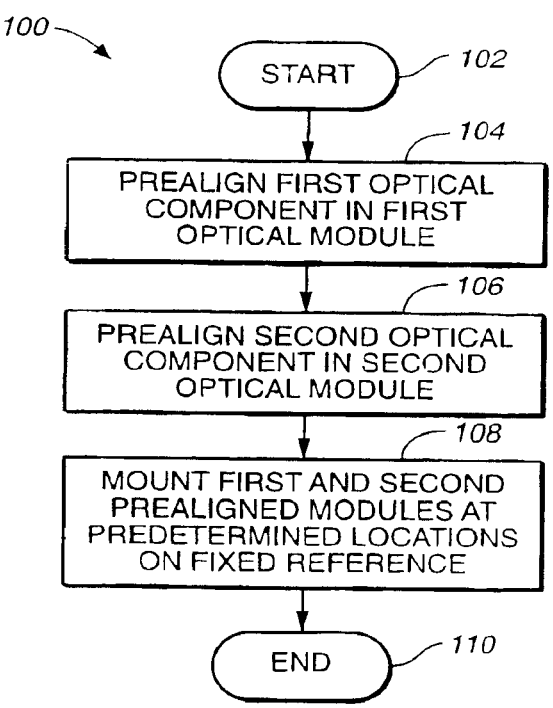
FIG._2

OPTICAL DEVICE

This application is a Continuation-In-Part of, and claims priority to, application Ser. No. 09/789,124, filed Feb. 20, 2001 now U.S. Pat. No. 6,546,172 and entitled OPTICAL DEVICE, application Ser. No. 09/789,125, filed Feb. 20, 2001 now U.S. Pat. No. 6,546,173 and entitled "OPTICAL MODULE", application Ser. No. 09/789,185, filed Feb. 20, 2001 now U.S. Pat. No. 6,443,631 and entitled "OPTICAL MODULE WITH SOLDER BOND", and application Ser. No. 09/789,317, filed Feb. 20, 2001 now U.S. Pat. No. 6,590,658 and entitled "OPTICAL ALIGNMENT SYSTEM".

BACKGROUND OF THE INVENTION

The present invention relates to optical components and optical devices fabricated from such components. More specifically, the present invention relates to an optical device formed by a plurality of optical modules which carry optical, optical-electrical or optical-mechanic components.

Optical devices are being increasingly used in various industries and technologies in order to provide high speed data transfer such as in fiber optic communication equipment. In many applications there is a transition or an incorporation of optical devices where previously only electrical devices were employed. An optical device typically consists of a number of components which must be precisely assembled and aligned for the device to operate and function efficiently. Example components include fibers, waveguides, lasers, modulators, detectors, gratings, optical amplifiers, lenses, mirrors, prisms, windows, etc.

Historically, optical devices such as those used in fiber optic telecommunications, data storage and retrieval, optical inspection, etc. have had little commonality in packaging and assembly methods. This limits the applicability of automation equipment for automating the manufacture of these devices since there is such a disparity in the device designs. To affect high volume automated manufacturing of such legacy devices, parts of each individual manufacturing line have to be custom-designed.

In contrast, industries such as printed circuit board manufacturing and semiconductor manufacturing have both evolved to have common design rules and packaging methods. This allows the same piece of automation equipment to be applied to a multitude of designs. Using printed circuits as an example, diverse applications ranging from computer motherboards to cellular telephones may be designed from essentially the same set of fundamental building blocks. These building blocks include printed circuit boards, integrated circuit chips, discrete capacitors, and so forth. Furthermore, the same automation equipment, such as a pick and place machine, is adaptable to the assembly of each of these designs because they use common components and design rules.

Additional complications arise in automated assembly of optical devices. Such assembly is complicated because of the precise mechanical alignment requirements of optical components. This adds to problems which arise due to design variations. These problems arise from the fact that many characteristics of optical components cannot be economically controlled to exacting tolerances. Examples of these properties include the fiber core concentricity with respect to the cladding, the location and orientation of the optical axis of a lens with respect to its outside mechanical dimensions, the back focal position of a lens, the spectral characteristics of a thin-film interference filter, etc. Even if the mechanical mounting of each optical element were such that each element was located in its exact theoretical design position, due to the tolerances listed above, the performance specifications of the optical device may not be met.

To appreciate the exacting alignment requirements of high performance optical devices, consider the simple example of aligning two single mode optical fibers. In this example, the following mechanical alignments are required to ensure adequate light coupling from one fiber to the other: the angle of the fibers with respect to each other, the fiber face angle, the transverse alignment (perpendicular to the light propagation direction) and the longitudinal spacing (parallel to the light propagation direction).

Typical single mode optical fibers used in telecommunications for the 1.3 $\mu$m to 1.6 $\mu$m wavelength range have an effective core diameter of about 9 microns and an outside cladding dimension of 125 microns. The typical tolerance for the concentricity of the core to the outside diameter of the cladding is 1 micron. If the outside claddings of the two fibers were perfectly aligned and there is no angular misalignment or longitudinal spacing, the cores may still be transversely misaligned by as much as 2 microns. This misalignment would give a theoretical coupling loss of about 14 percent or 0.65 dB. This loss is unacceptable in many applications. It would be desirable to provide an optical device or a method of fabricating optical devices, which addresses some of the deficiencies of the prior art.

SUMMARY OF THE INVENTION

An optical device includes a fixed reference. A first optical module has a first optical component, prealigned with respect to a reference feature, the first optical module is mounted to a first predetermined location on the fixed reference. A second optical module has a second optical component prealigned with respect to a reference feature, the second optical module mounted to a second predetermined location on the fixed reference.

BRIEF DESCRIPTION OF THE DRAWINGS

FIG. 1 is a block diagram of an optical device in accordance with the present invention.

FIG. 2 is a flow chart showing steps in assembly of the optical device of FIG. 1.

DETAILED DESCRIPTION OF THE PREFERRED EMBODIMENTS

The present invention includes various aspects that reduce or eliminate many of the problems associated with the prior art. The present invention offers an optical device fabricated from optical modules which are prealigned in standardized optical modules. Each optical module can be aligned with sub-micron precision with respect to a reference standard which provides a reference frame such as one defined with respect to registration features. A module is positioned at a predetermined location on a fixed reference, such as a substrate. The invention includes the recognition that techniques similar to mounting an electrical component in or on a printed circuit board can be used with optical components. Optical devices can be easily fabricated by mounting prealigned optical modules to the optical "circuit board". The prealignment of the optical module can compensate for variations between components to thereby essentially eliminate the effects of component variability. The prealigned optical modules are well suited for automated fabrication of devices. The modules can be fabricated in silicon using techniques which are well known in the art of silicon processing. However, any appropriate material can be used. Preferable materials are those which are used with existing electrical or optical components. Further, the invention can be used with active optical devices such as lasers, modulators, detectors, etc. Electrical conductors can be fabricated on the various layers for coupling to active optical components. Electrical circuitry including analog and digital circuitry can also be fabricated directly on the modules or on the fixed reference mount.

In one aspect, the present invention provides an optical device formed from at least two optical modules in which optical components are mounted to prealignment mounts. The optical component is prealigned to a reference standard at a desired position and orientation. The optical module is coupled to a fixed reference at a desired location such that the optical component is maintained at a desired position and orientation relative to the fixed reference. In this general configuration, the optical component can be prealigned relative to a desired spacial reference or orientation as defined by a reference standard and oriented by adjusting the optical component relative to the reference standard prior to fixing the component with the prealignment mount. This can be used to provide general component prealignment as well as compensate for the variations which can arise between optical components.

FIG. 1 is a block diagram of an optical device 10 in accordance with the present invention. Optical device 10 includes optical modules 12A and 12B coupled to a fixed reference 14. FIG. 1 illustrates the invention in terms of a block diagram and the present invention is not limited to any particular physical implementation.

Optical modules 12A and 12B each include optical components 16A and 16B which may be optical, optical-electrical, or optical-mechanical which are fixed to prealignment mounts 18A and 18B, respectively. Each optical component 16A and 16B is prealigned with a reference standard 20 prior to mounting onto fixed reference 14.

Reference standard 20 is shown as a block and is intended to illustrate the concept of a standardized reference frame and is not limited to a single physical implementation. The standard 20 may comprise different physical implementations for different types of optical components. However, in general, when an optical component is prealigned in accordance with the reference standard 20, that optical component is aligned such that it will properly optically interact, in a desired manner, with another optical component which has also been prealigned to the same standardized reference frame when those two optical components are placed at predetermined locations in fixed reference 14. The reference standard provides a reference frame through which optical components can be prealigned such that they can optically interact in a desired manner once mounted in the fixed reference. The prealignment can be any type of alignment using any alignment technique. The prealignment of the optical components 16A and 16B to reference standard 20 can occur at a remote location and/or at a different time from the assembly of optical modules 12A and 12B to fixed reference 14.

The prealignment of the optical component 16A and 16B to reference standard 20 is through adjustment of the optical components 16A and 16B in prealignment mounts 18A and 18B. In the embodiment shown, prior to mounting the optical component 16A,16B to the prealignment mount 18A,B, the optical component 16A,B is allowed six degrees of freedom during the prealignment process. However, the number of degrees of freedom can be any number 1–6. Once the prealignment has been performed, the optical component 12 is fixedly coupled to the respective prealignment mount 18A or 18B using any appropriate mounting technique. If desired, in one embodiment an optical component can be subsequently realigned.

After the optical components 16A,16B are prealigned in the prealignment mounts 18A,18B, the optical modules 12A and 12B are mounted to the fixed reference. The mounting is at predetermined locations 30A and 30B. Predetermined locations 30A and 30B are positioned such that the optical components 16A and 16B, having been prealigned to the reference standard 20, will be aligned in a manner such that one optical component can optically interact with the other optical component. Predetermined locations 30A and 30B can comprise registration features on fixed reference 14. The registration features 30A and 30B are also prealigned such that when an optical module 16A,B is placed at predetermined locations 30A,B it will be aligned in manner such that it will properly interact with the other optical component.

In one aspect, prealignment mount couplings 40A,40B couple respective optical components to prealignment mounts 18A,B to fix the alignment of optical components 16A,B relative to reference standard 20. Similarly, fixed reference couplings 42A,B couple prealignment mounts 18A,B to the fixed reference 14. In one example, fixed reference couplings comprise registration features on mounts 18A,B that mate with registration features on fixed reference 14.

FIG. 2 is a flow chart 100 showing steps in assembly of an optical device in accordance with the invention. Flow chart 100 begins at start block 102 and control is passed to block 104. At block 104, a first optical component in a first optical module is prealigned to a reference standard. At block 106, a second optical component in a second optical module is prealigned to the reference standard. The modules are fixed relative the prealignment mounts which they are in alignment.

At block 108, the first and second prealigned optical modules are mounted at predetermined locations on a fixed reference. As discussed above, the predetermined locations are such that the optical components, being prealigned, are positioned such that at least one of the optical components can optically interact with the other optical component. The procedure terminates at block 110.

Of course, the steps do not need to be carried out in the precise sequence shown in FIG. 2, however, the optical components should be prealigned prior to mounting onto the fixed reference. Although FIGS. 1 and 2 only show two optical modules, any number of additional optical modules can be used for fabricating more complex devices. Additionally, the optical modules can carry electrical circuitry (i.e., active components) which can be used in forming an optical device. The following references set forth example specific implementations and example aspects of the present invention: application Ser. No. 09/789,125, filed Feb. 20, 2001, entitled OPTICAL MODULE; application Ser. No. 09/789,185, filed Feb. 20, 2001, entitled OPTICAL MODULE WITH SOLDER BOND; application Ser. No. 09/789,124, filed Feb. 20, 2001, entitled OPTICAL DEVICE; application Ser. No. 09/789,317, filed Feb. 20, 2001, entitled OPTICAL ALIGNMENT SYSTEM; application Ser. No. 60/276,323, filed Mar. 16, 2001, entitled OPTICAL CIRCUIT PICK AND PLACE MACHINE; application Ser. No. 60/276,335, filed Mar. 16, 2001, entitled OPTICAL CIRCUITS WITH ELECTRICAL SIGNAL ROUTING; application Ser. No. 60/276,336, filed Mar. 16, 2001, entitled OPTICAL CIRCUITS WITH THERMAL MANAGEMENT; and application Ser. No. 60/288,169, filed May 2, 2001, entitled OPTICAL CIRCUIT PICK AND PLACE MACHINE. The present invention is not limited to these specific examples and implementations and, when interpreting the following claims, the invention is intended to cover the broad aspects set forth in FIGS. 1 and 2. Unless language is specifically stated in the claims to the contrary, the claims should not be interpreted in a manner which is narrower than these block diagram implementations.

With the present invention, common design rules, packages and packaging methods can be used with the standard reference frame to assist in automated assembly of optical devices. Those skilled in the art will recognize that the same automation equipment can be used to assemble a wide variety of devices and handle optical modules containing a wide variety of optical and/or electrical components. In addition to providing a prealigned optical component, the prealignment can be used to remove or compensate for variations in those optical characteristics which are functions of a component's orientation. For example, the misalignment between fibers due to fiber variation described in the Background section is compensated by the prealignment process and does not limit device efficiency when the modules are ultimately mounted in the fixed reference.

Although the present invention has been described with reference to preferred embodiments, workers skilled in the art will recognize that changes may be made in form and detail without departing from the spirit and scope of the invention. In one aspect, the prealignment can be performed in less than all six degrees of freedom. Alignment in one or more of the remaining degrees of freedom can be performed in-situ, i.e., while a prealigned module is placed, or in the process of being placed, in the fixed reference. In one aspect, FIG. 2 comprises computer software configured to implement the method, for example, in an automated assembly machine. An optical device of the invention can comprise any number of optical modules and the invention is not limited to the numbers illustrated herein.

What is claimed is:

1. An optical device, comprising:
   a fixed reference;
   a first standardized optical module having a first optical component prealigned relative to an external reference frame provided by an external reference standard, the first optical module mounted to a first predetermined location on the fixed reference; and
   a second standardized optical module having a second optical component prealigned relative to the external reference frame provided by the external reference standard, the second optical module mounted to a second predetermined location on the fixed reference;
   wherein the first and second optical modules are prealigned relative to the external reference frame provided by the external reference standard and mounted at the first and second predetermined locations such that the optical components optically interact with one another in a desired manner, without further alignment.

2. The optical device of claim 1 wherein the first and second optical modules carry reference features and the prealignment is with respect to the external reference features.

3. The optical device of claims 1 or 2 wherein the fixed reference carries reference features at the first and second predetermined locations.

4. The optical device of claim 1 wherein the first optical module comprises:
   a first prealignment mount; and
   the first optical component is mounted in the first prealignment mount.

5. The optical device of claim 4 wherein the second optical module comprises:
   a second prealignment mount; and
   the second optical component mounted in the second prealignment mount.

6. The optical device of claim 4 wherein the first optical component is fixed at a prealigned orientation by the first prealignment mount.

7. The optical device of claim 6 wherein the first optical component can move with six degrees of freedom relative to reference features prior to being fixed to the first prealignment mount.

8. The optical device of claim 4 including a prealignment mount coupling adapted to fixedly couple the first optical component to the first prealignment mount at a prealigned orientation.

9. The optical device of claim 1 including a first fixed reference coupling to fixedly couple the first optical module to the fixed reference.

10. An optical device, comprising:
    a fixed reference;
    a first standardized optical module comprising:
       a first optical component;
       a first prealignment mount;
       a first fixed reference coupling which fixedly couples the prealignment mount to a predetermined location on the fixed reference;
       a first prealignment mount coupling which fixedly couples the first optical component to the first prealignment mount at a prealigned orientation relative to an external reference frame of an external reference standard and the fixed reference coupling;
    a second standardized optical module comprising:
       a second optical component;
       a second prealignment mount;
       a fixed reference coupling which fixedly couples the prealignment mount to a predetermined location on the fixed reference;
       a second prealignment mount coupling which fixedly couples the second optical component to the second prealignment mount at a prealigned orientation relative to the external reference frame of the external reference standard and to the fixed reference coupling;
    wherein the first and second optical components are oriented in the external reference frame to optically interact with one another in a desired manner, without further alignment.

11. The optical device of claim 10 wherein the first and second fixed reference coupling include reference features.

12. The optical device of claims 10 or 11 wherein the fixed reference includes reference features at the first and second predetermined locations.

13. The optical device of claim 10 wherein the first optical component can move with six degrees of freedom prior to being fixed by the first prealignment mount coupling.

14. A method of manufacturing an optical device, comprising:
    obtaining a fixed reference;
    obtaining a first standardized prealigned optical module having a first optical component prealigned with an external reference frame provided by an external reference standard;

obtaining a second standardized prealigned optical module having a second optical component prealigned with the external reference frame of the external reference standard; and fixedly mounting the first and second optical modules at predetermined locations on the fixed reference wherein the first and second optical devices are positioned to optically interact with each other in a desired manner due to their prealignment with the external reference frame of the reference standard and without further alignment.

15. The method of claim 14 including placing the first and second prealigned optical modules at predetermined locations on the fixed reference prior to fixedly mounting.

16. The method of claim 14 including prealigning the first and second optical modules prior to fixedly mounting.

17. The method of claim 16 wherein prealigning the first and second optical modules comprises aligning the modules in a reference frame defined by the external reference standard.

18. The method of claim 17 wherein prealigning comprises fixing the first and second optical components in prealignment mounts, respectively.

19. The method of claim 16 wherein prealigning includes compensating for optical variations in the optical components.

20. The method of claim 19 including:

obtaining a third prealigned optical module having a third optical component prealigned with the external reference standard; and fixedly mounting the third prealigned optical module at a predetermined location on the fixed reference wherein the third optical module is positioned to optically interact in a desired manner with at least one of the first and second optical modules.

21. An optical device manufactured in accordance with claim 14.

22. Computer software configured to implement the method of claim 14.

* * * * *